(12) United States Patent
Chen et al.

(10) Patent No.: US 8,867,183 B2
(45) Date of Patent: Oct. 21, 2014

(54) ESD PROTECTION TECHNIQUES

(75) Inventors: Bo-Ting Chen, Fengyuan City (TW); Tzu-Heng Chang, New Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 97 days.

(21) Appl. No.: 13/217,533

(22) Filed: Aug. 25, 2011

(65) Prior Publication Data

US 2013/0050885 A1  Feb. 28, 2013

(51) Int. Cl.
*H02H 9/04* (2006.01)

(52) U.S. Cl.
CPC .................................... *H02H 9/04* (2013.01)
USPC .......................................................... 361/56

(58) Field of Classification Search
USPC .......................................................... 361/56
See application file for complete search history.

(56) References Cited

U.S. PATENT DOCUMENTS

| | | | |
|---|---|---|---|
| 6,249,410 B1 * | 6/2001 | Ker et al. .................... | 361/56 |
| 6,310,379 B1 | 10/2001 | Andresen et al. | |
| 7,221,551 B2 | 5/2007 | Chen | |
| 7,529,070 B2 * | 5/2009 | Bhattacharya et al. ........ | 361/56 |
| 2003/0223166 A1 * | 12/2003 | Chen et al. ................... | 361/56 |
| 2009/0089719 A1 * | 4/2009 | Gauthier et al. .............. | 716/1 |
| 2011/0149449 A1 * | 6/2011 | Lin et al. ..................... | 361/56 |

OTHER PUBLICATIONS

Melikyan, Vazgen, et al. "5V Tolerant Power clamps for Mixed-Voltage IC's in 65nm 2.5V Salicided CMOS Technology." 4 Pages, Sep. 2010.
Ker, Ming-Dou, et al. "ESD Protection Design With On-Chip ESD Bus and High-Voltage-Tolerant ESD Clamp Circuit for Mixed-Voltage I/O Buffers." IEEE Transactions on Electron Devices, Vol. 55, No. 6, Jun. 2008. 8 Pages.
Wang, Guang-Cheng, et al. "Gate-Driven 3.3V ESD Clamp Using 1.8V Transistors." 3 Pages, May 2011.

* cited by examiner

*Primary Examiner* — Jared Fureman
*Assistant Examiner* — Kevin J Comber
(74) *Attorney, Agent, or Firm* — Eschweiler & Associates, LLC (57) ABSTRACT

Some embodiments relate to an electrostatic discharge (ESD) protection device to protect a circuit that is electrically connected to first and second circuit nodes from an ESD event. The ESD protection device includes a first electrical path extending between the first and second circuit nodes and including first and second ESD detection elements arranged thereon. The ESD protection device also includes first and second voltage bias elements having respective inputs electrically connected to respective outputs of the first and second ESD detection elements. A second electrical path extends between the first and second circuit nodes and is in parallel with the first electrical path. The second electrical path includes a voltage controlled shunt network having at least two control terminals electrically connected to respective outputs of the first and second voltage bias elements. Other embodiments are also disclosed.

19 Claims, 5 Drawing Sheets

FIG. 1

(PRIOR ART)

ESD PROTECTION TECHNIQUES

BACKGROUND

An electrostatic discharge (ESD) pulse is a sudden and unexpected voltage and/or current discharge that transfers energy to an electronic device from an outside body (e.g., a human body, which can be approximated in modeling by a human body model (HBM)). ESD pulses can damage electronic devices, for example by "blowing out" a gate oxide of a transistor in cases of high voltage or by "melting" an active region area of a device in cases of high current, causing junction failure. If devices are damaged by an ESD pulse, the electronic product can be rendered less operable than desired, or can even be rendered inoperable altogether.

Figure 1:
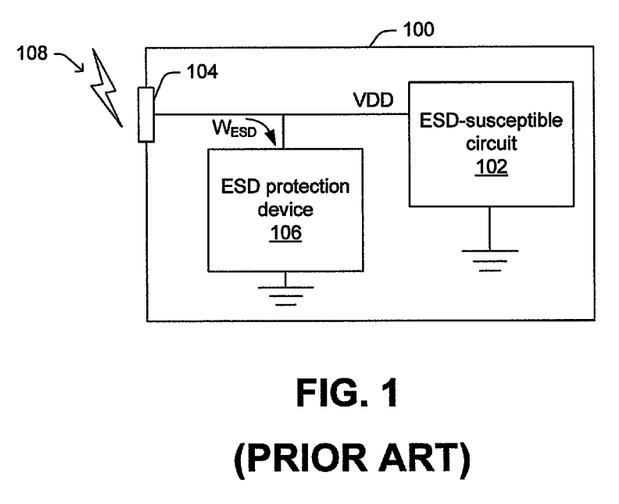
FIG. 1 shows an integrated circuit that makes use of a conventional ESD protection device.

To protect electronic devices from ESD pulses, engineers have developed ESD protection devices. FIG. 1 shows an example of an integrated circuit 100 that includes an ESD-susceptible circuit 102 (e.g., one or more semiconductor devices) electrically connected to an exterior circuit assembly (not shown) via an external IC pin 104. The external IC pin 104 can be a supply pin that supplies a DC supply voltage (e.g., VDD or VSS) to the circuit 102, or can be an input/output (I/O) pin that transfers input or output signals there from, for example. A conventional ESD protection device 106 is electrically connected between the circuit 102 and the external pin 104 to mitigate damage due to an ESD pulse 108. If an ESD pulse 108 occurs, the ESD protection device 106 detects the ESD pulse 108 and shunts the energy associated with it away from the circuit 102 (e.g., as shown by arrow $W_{ESD}$), thereby preventing damage to the circuit 102. In the absence of an ESD pulse 108, the ESD protection device 106 is off and thus leaves signals between circuit 102 and pin 104 unchanged.

Although ESD devices are well known and widely deployed, the inventors have appreciated that conventional ESD protection devices suffer from some shortcomings. One particular shortcoming arises when designers want to move to a new technology node that includes lower voltage devices, relative to previous technology nodes. In some instances, the designers may want to use the newer, lower-voltage devices for a first on-chip circuit (e.g., >having 2.5V devices), while using higher-voltage devices for a second on-chip circuit (e.g., having 5 V devices). If an ESD protection device made up of lower-voltage devices (e.g., >2.5 V devices) were to be used as an interface to the second, higher-voltage circuit, the low-voltage devices would potentially be unable to reliably withstand the high-voltage signal (e.g., 5V). One way to alleviate this problem is by using two different gate oxide thicknesses—namely, a first, relatively thin gate oxide for the ESD protection device interfacing to the first, low voltage circuit; and a second, relatively thick gate oxide for the ESD protection device interfacing to the second, higher voltage circuit. Unfortunately, however, two different gate oxide thicknesses on a single IC requires a significant number of masks, and is therefore not an optimum solution. Also, a thicker gate oxide for an ESD protection device tends to lead to high trigger voltages and/or the ESD protection device being slow to turn on when an ESD event is detected. Either of these conditions can potentially allow some of the power in the ESD pulse to reach the ESD susceptible circuit, potentially damaging the ESD susceptible circuit.

In view of the above, the inventors have devised improved ESD protection techniques.

DETAILED DESCRIPTION

One or more implementations of the present invention will now be described with reference to the attached drawings, wherein like reference numerals are used to refer to like elements throughout. The drawings are not necessarily drawn to scale.

Figure 2A:
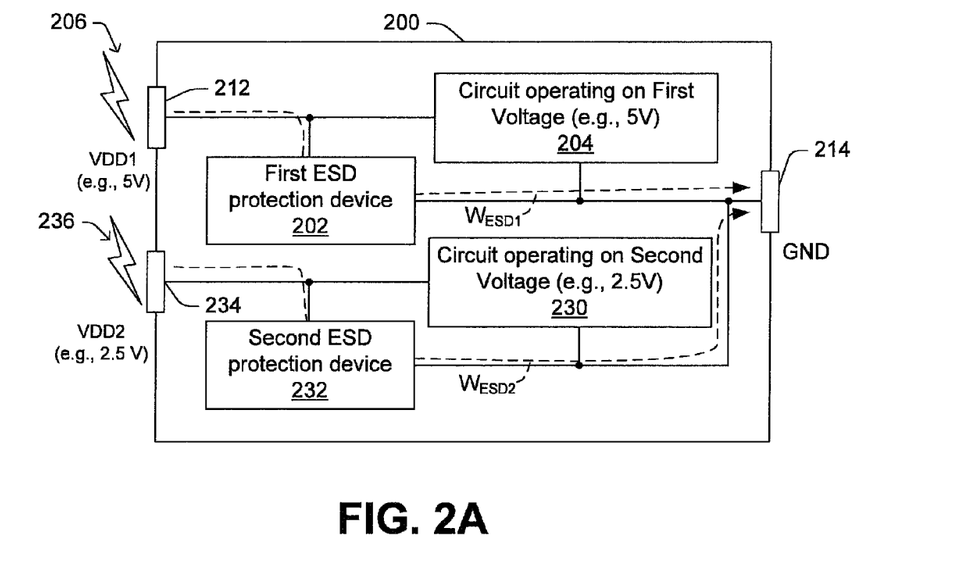
FIG. 2A shows an integrated circuit in accordance with some embodiments, wherein the integrated circuit includes two circuits that operate at different voltages, and which are protected by two different ESD protection devices.

Various embodiments described below relate to improved ESD protection devices. FIG. 2A shows an integrated circuit 200 that includes a first circuit 204 having devices structured to operate at a first voltage (e.g., 5V), and including a second circuit 230 having devices structured to operate at a second voltage (e.g., <2.5V). A first ESD protection device 202, which acts as an interface between first circuit 204 and external pins (212, 214), is arranged to protect the first circuit 204 from ESD event 206, as indicated by arrow $W_{ESD1}$. A second ESD protection device 232, which acts as an interface between the second circuit 230 and external pins (234, 214), is arranged to protect the second circuit 230 from ESD event 236 as indicated by arrow $W_{ESD2}$. Because the ESD protection devices 202, 232 see different normal operating voltages (e.g., 5V and 2.5V respectively), they need to reliably withstand different voltage biases during normal operation. To avoid or limit the use of different gate oxide thicknesses on the IC 200, this disclosure provides for ESD protection circuits include multiple ESD detection elements, which can be "stacked" in series to withstand higher voltages. For example, by including "stacked" low-voltage ESD detection elements in first ESD protection device 202, the first ESD protection device 202 can be made of lower-voltage (e.g., 2.5 V) transistors and still interface to a higher voltage (e.g., 5V) first circuit 204. In this way, the techniques disclosed herein allow designers to use a single gate oxide thickness for devices of first and second ESD protection devices 202, 232, even though these ESD protection devices see different normal operating voltages. This streamlines manufacturing and provides uniformly fast response times to ESD events when thin gate oxides are used.

Figure 2B:
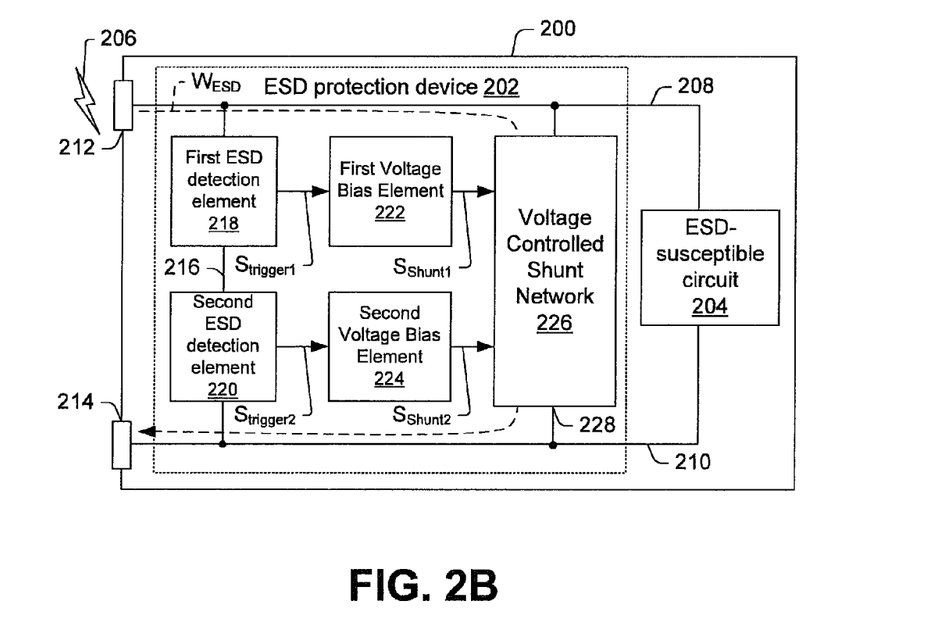
FIG. 2B shows a block diagram of an ESD protection device in accordance with some embodiments.

Referring now to FIG. 2B, one can see an more detailed example of an ESD protection device 202 that includes "stacked" ESD detection elements. Like the previously discussed implementations, the ESD protection device 202 can be included on an integrated circuit 200 that includes one or more ESD-susceptible circuits 204, which can be potentially damaged by an impingent ESD event 206. The circuit 204 can be electrically connected to first and second circuit nodes 208, 210 (e.g., $V_{dd}$, $V_{ss}$ supplies, respectively), which can be associated with first and second external IC pins 212, 214, respectively. It will be appreciated that although FIG. 2 shows the first and second circuit nodes 208, 210 electrically connected to external IC pins 212, 214, in other embodiments the first and second circuit nodes 208, 210 can be located on internal nodes within the IC 202.

The ESD protection device 200 includes a first electrical path 216 extending between the first and second circuit nodes 208, 210. The first electrical path 216 includes first and second ESD detection elements 218, 220 arranged in series thereon. The first and second ESD detection elements 218, 220 can selectively assert first and second trigger signals ($S_{trigger1}$, $S_{trigger2}$, respectively), based on whether the first and second ESD detection elements 218, 220 detect the ESD event 206. Often, the first and second trigger signals are asserted based on whether a voltage difference across the first and second ESD detection elements 218, 220 exceeds a predetermined voltage threshold, which corresponds to an ESD pulse.

First and second voltage bias elements 222, 224 have inputs electrically connected to respective outputs of first and second ESD detection elements 218, 220, respectively. The first and second voltage bias elements 222, 224 can provide first and second shunt control signals ($S_{shunt1}$, $S_{shunt2}$, respectively), based on the first and second trigger signals, ($S_{trigger1}$, $S_{trigger2}$, respectively).

A voltage controlled shunt network 226 is electrically connected to a second electrical path 228, which extends between the first and second circuit nodes 208, 210 and is in parallel with the first electrical path 216. The voltage controlled shunt network 226 has at least two inputs electrically connected to the outputs of first and second voltage bias elements 222, 224, respectively. The voltage-controlled shunt network 226 is adapted to selectively shunt energy from the ESD event 206 over the second electrical path 228 based on the first and second shunt control signals ($S_{shunt1}$, $S_{shunt2}$, respectively).

During operation, if an ESD pulse 206 is detected, the first and second trigger signals ($S_{trigger1}$, $S_{trigger2}$) are activated, which correspondingly activates the first and second shunt signals ($S_{shunt1}$, $S_{shunt2}$). The first and second shunt signals cause the voltage controlled shunt network to turn on, thereby discharging energy of the ESD event 205 over the second electrical path 228. After the ESD event passes, the trigger signals and shunt signals are again de-activated, and the voltage controlled shunt network is turned off so normal circuit operation can again occur.

As will be appreciated in greater detail further herein, the "stacked" arrangement of the first and second ESD detection elements 218, 220, which are arranged in series with one another, acts in some regards as a resistive divider. Hence, rather than a high-voltage signal being applied across a single semiconductor device, the "stacked" arrangement of FIG. 2B helps to "step down" the voltage level applied across individual semiconductor devices. Because of this, the stacked arrangement helps facilitate the use of low-power devices, which can have relatively thin gate oxides, for higher power applications. By comparison, if the integrated circuit 200 were to include a second ESD protection device (e.g., 232 of FIG. 2A), which interfaced to a lower-voltage circuit (e.g., 230 of FIG. 2A), there would be no need for "stacked" elements such that the second ESD protection device could omit the second ESD detection element 220 and the second voltage bias element 224 shown in FIG. 2B. Other more conventional architectures could also be used for the second ESD protection device.

Figure 3:
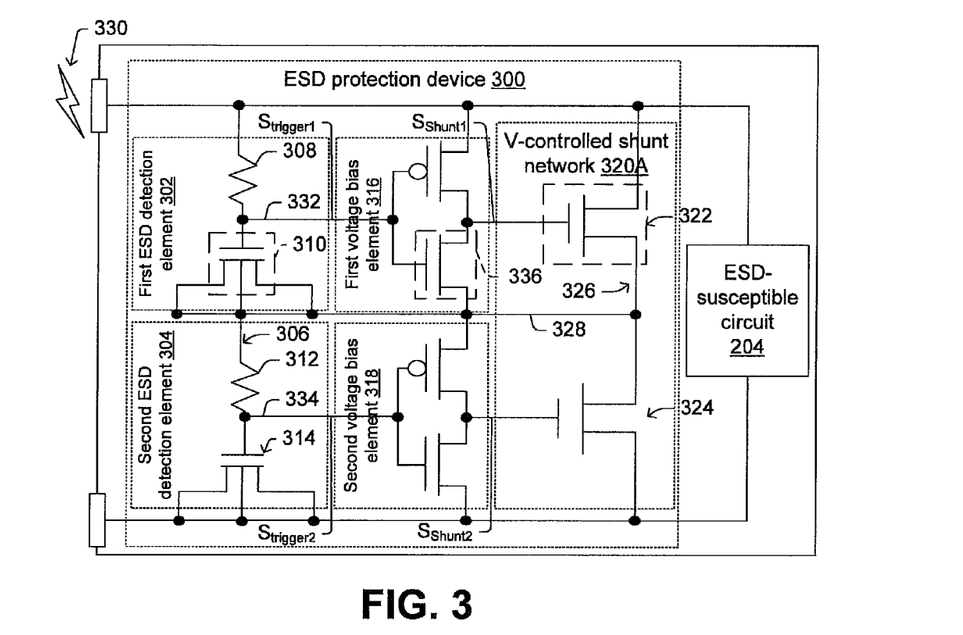
FIG. 3 shows a circuit schematic of an ESD protection device in accordance with some embodiments.
Figure 4:
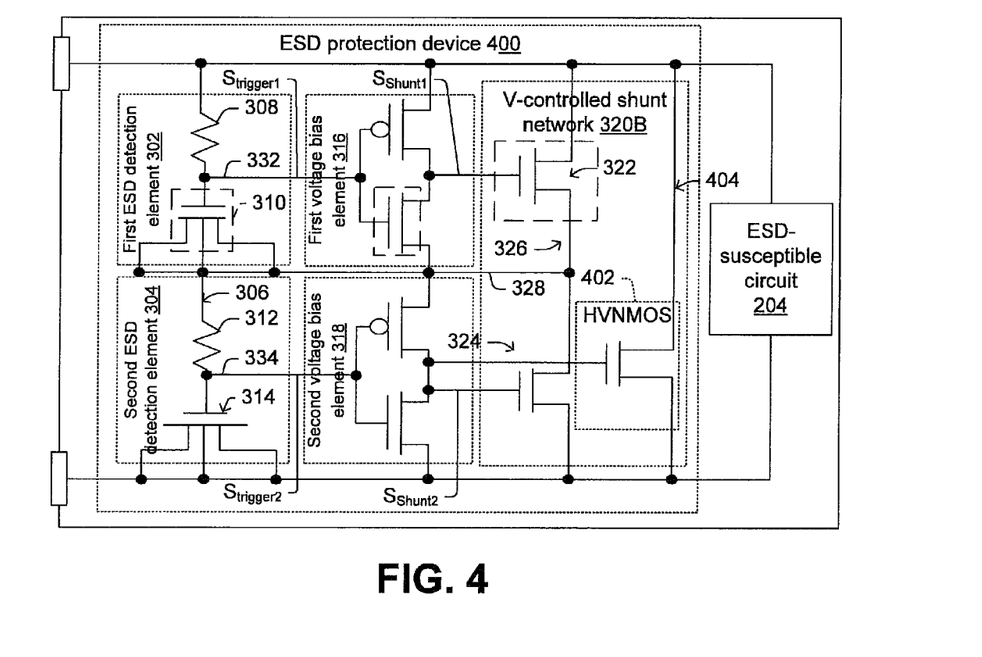
FIG. 4 shows a circuit schematic of an ESD protection device in accordance with some embodiments.
Figure 5:
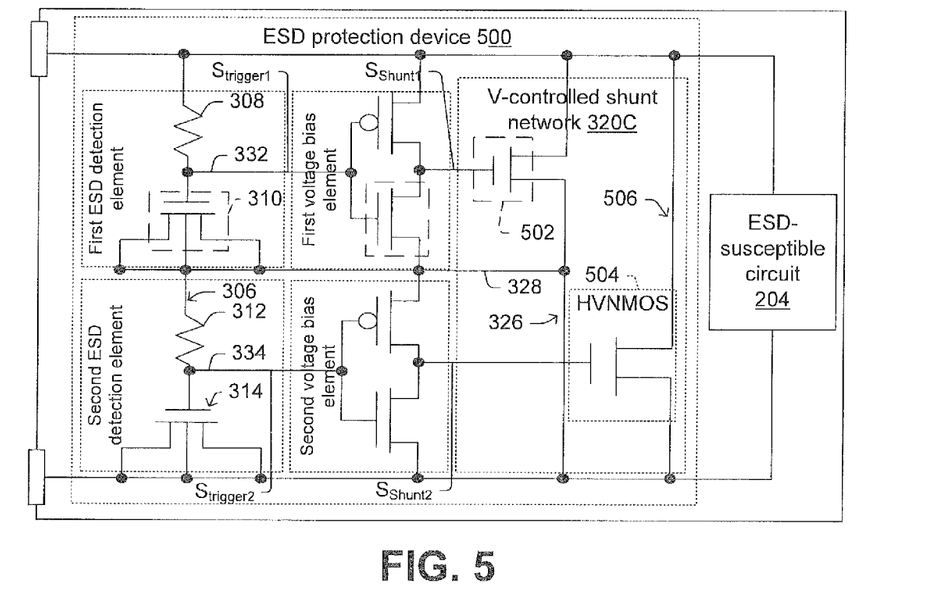
FIG. 5 shows a circuit schematic of an ESD protection device in accordance with some embodiments.

The components of FIG. 2B may take one of several different forms depending on the particular implementation. To help elucidate some of these forms, FIGS. 3-5 are described below. It will be appreciated that these examples do not limit the scope of the present disclosure, but rather illustrate merely a few examples of how the concepts disclosed herein may be realized.

FIG. 3 shows another embodiment of an ESD protection device 300 in accordance with some embodiments. In this example, first and second ESD detection elements 302, 304 are arranged in series on a first electrical path 306. Each ESD detection element takes the form of a resistor in series with a capacitive element. Thus, the first ESD detection element 302 includes a first resistor 308 in series with first capacitive element 310; and the second ESD detection element 304 includes a second resistor 312 in series with a second capacitive element 314. The resistors 308, 312 can be implemented as polysilicon segments or as PMOS devices with their gates tied to a logical "0" value, for example; while the capacitive elements 310, 314 can take the form of a low-voltage NMOS device having a gate to substrate capacitance, for example.

First and second voltage bias elements 316, 318, which are implemented as first and second inverting elements, respectively, have their respective inputs electrically connected to output nodes the first and second ESD detection elements 302, 304, respectively. In FIG. 3's embodiment, each inverting element includes a single inverter made up of a PMOS device and an NMOS device. However, in other embodiments, each inverting element can also include additional inverters (e.g., each inverting element can be made up of three inverters chained one after another, rather than just a single inverter as illustrated).

FIG. 3's illustrated voltage controlled shunt network 320A includes first and second shunt transistors 322, 324 (e.g., NMOS transistors), which are arranged on in series a second electrical path 326. A supply node 328 electrically connects the source of the first shunt transistor 322 and a drain of the second shunt transistor 324 to the ESD detection elements 302, 304 and to the voltage bias elements 316, 318, as shown. Transistors 310, 336, and 322 can be formed in deep n-wells (as indicated by dashed lines) to help them withstand slightly higher voltage biases, relative to the other transistors.

During operation, an impingent ESD event 330 causes the capacitive devices 310, 314 to act like electrical shorts, thus pulling first and second ESD detection output nodes (332, 334, respectively) low. In this way, when an ESD event is present, the first and second trigger signals exhibit a relatively low-voltage (e.g., representing logical "0" states) just after the onset of the ESD event 330. These relatively low-voltage pulses cause the first and second inverting elements 316, 318 to correspondingly pulse the first and second shunt control signals to relatively high voltages (e.g., representing logical "1" states). The high voltage pulses on the first and second shunt control signals turn on the first and second shunt transistors 322, 324. The energy of the ESD pulse 330 now flows over the second electrical path 326 (which now has a low resistance because transistors 322, 324 are on) such that the energy of the ESD pulse is diverted away from the ESD-susceptible circuit 204. In the absence of an ESD pulse, the first and second ESD detection output nodes (332, 334, respectively) will be high, which will tend to pull signals $S_{shunt1}$, $S_{shunt1}$ low to turn off shunt network 320A.

FIG. 4 shows an ESD protection device 400 that includes another embodiment of a voltage controlled shunt network 320B. In this embodiment, the voltage controlled shunt network 320B again includes a second electrical path 326 on which first and second shunt transistors 322, 324 are included. In addition, the voltage controlled shunt network 320B also includes a third shunt transistor 402 disposed on a third electrical path 404. Because the third shunt transistor 402 can be the only component on the third electrical path 404, the third shunt transistor 402 can have structural features that help it to withstand relatively high voltage biases (e.g., a 5 V gate to drain ($V_{GD}$) or drain to source ($V_{DS}$) bias). For example, in some embodiments, the third shunt transistor 402 can include a longer drain region than the other transistors in the ESD protection device 400, wherein the longer drain region helps safely dissipate a higher voltage. The drain of the third shunt transistor 402 could also have an overall lower dosing profile (e.g., n+ instead of n++), relative to the drains of the other transistors in the ESD protection device 400, which provides a slightly lower conductivity and again can help dissipate a higher voltage.

FIG. 5 shows an ESD protection device 500 that includes another embodiment of a voltage controlled shunt network 320C. In this embodiment, the voltage controlled shunt network again includes a second electrical path 326 on which a first shunt transistor 502 is included. In addition, the voltage controlled shunt network 320C also includes a second shunt transistor 504 disposed on a third electrical path 506. The first shunt transistor 502 can be formed in a deep n-well; and the second shunt transistor 504 can include a longer or lower doped drain region to help withstand higher $V_s$.

Figure 6:
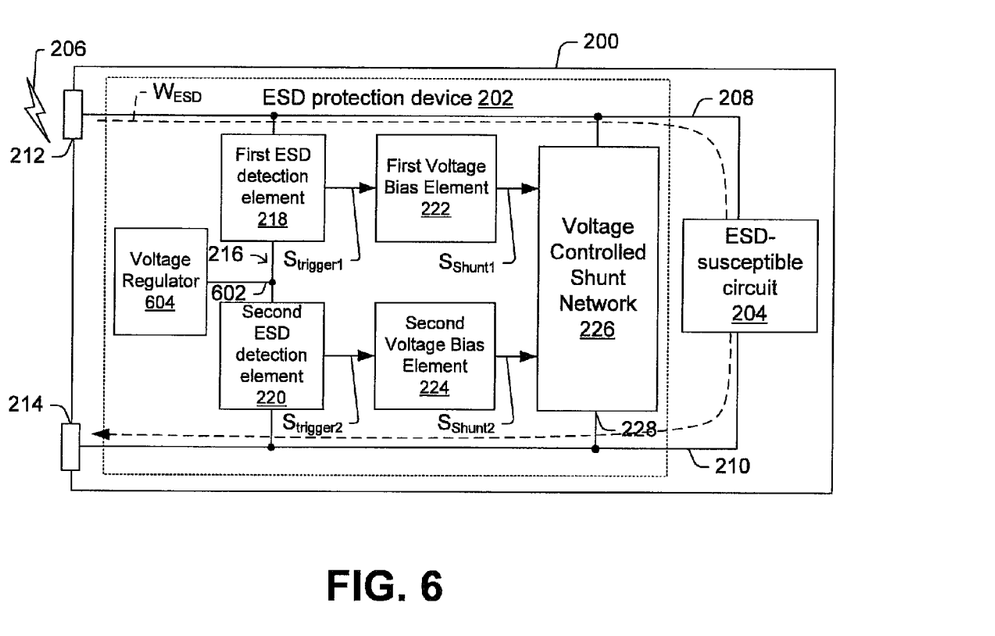
FIG. 6 shows a block diagram of an ESD protection device in accordance with another embodiment.
Figure 7:
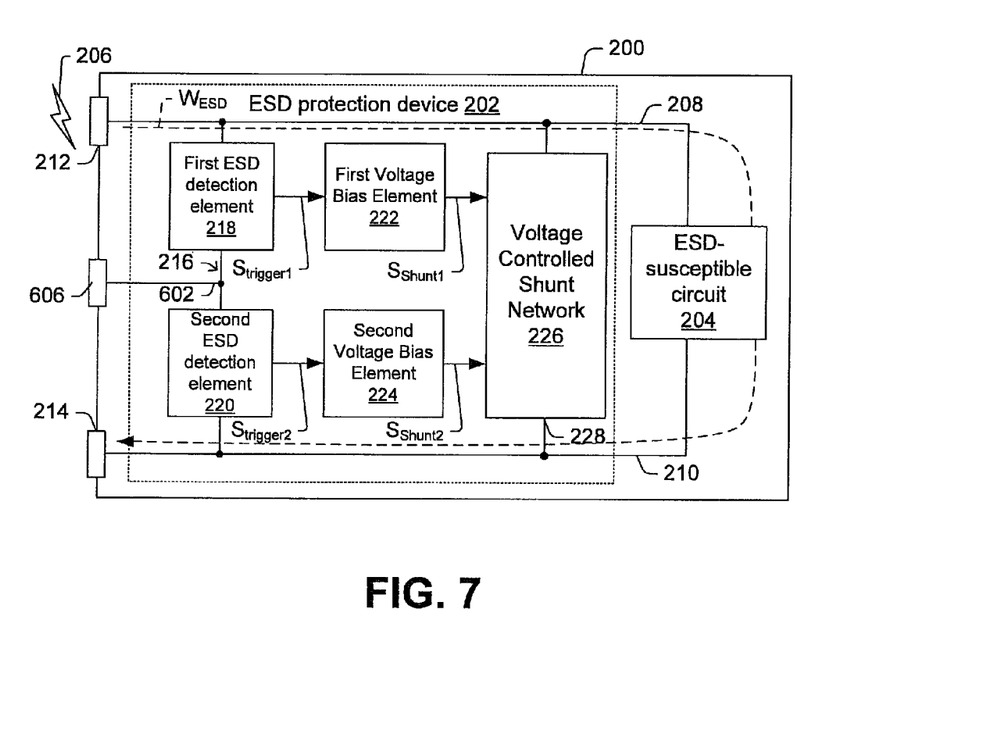
FIG. 7 shows a block diagram of an ESD protection device in accordance with another embodiment.

FIG. 6 shows another embodiment of an ESD protection device 600. In this embodiment, the ESD protection device 600 includes a supply node 602 disposed between the first and second ESD detection elements 218, 220. This supply node 602 is used to establish a supply voltage, which lies between the voltage of the first circuit node 208 (e.g., $V_{DD}$) and the voltage of the second circuit node 210 (e.g., $V_{SS}$). For example, in some embodiments, the supply voltage can be approximately mid-way between the voltages on the first and second circuit nodes. In FIG. 6's embodiment, the voltage set point is established by an on-chip voltage regulator 604, although it could also be established by a voltage divider or other similar circuits. FIG. 7 shows an alternative embodiment, where rather than an on-chip voltage regulator (e.g. 604 of FIG. 6), the supply node 602 is electrically connected to an external IC pin 606 by which the voltage set point is established.

In either FIG. 6 or FIG. 7, during operation, the supply voltage is continuously provided to the supply node 602. Thus, the first ESD detection element 218 is electrically connected between the first circuit node 208 (e.g., VDD or highest voltage) and the supply voltage (e.g., middle voltage); while the second ESD detection element is electrically connected between the supply voltage (e.g., middle voltage) and the second circuit node 210 (e.g., VSS or lowest voltage). When no ESD event is impingent, the first and second voltage bias elements 222, 224 leave the voltage controlled shunt network 226 in an off state. When an ESD event does occur, in contrast, the first and second voltage bias elements 222, 224 turn the voltage controlled shunt network 226 on. When turned on, the voltage controlled shunt network 226 discharges the ESD current, thereby limiting or preventing damage to the ESD-susceptible circuit 204.

It will be appreciated that the embodiments illustrated and described above are but a few examples contemplated as falling within the scope of the present disclosure. For example, although FIGS. 3-5 show the ESD detection elements as RC elements, other types of ESD detection elements can also be used to detect the presence of an ESD pulse. In addition, although FIGS. 3-5 shows two ESD detection elements arranged in series on the first electrical path (e.g., which can correspond to 216, 218 in FIG. 2), other embodiments can include three or more ESD detection elements arranged in series on the first electrical path. Also, although the transistors in FIGS. 3-5 have been shown as MOS-type devices, other types of transistors (e.g., bipolar junction transistors (BJTs)) could also be used. In addition, although the illustrated circuit examples show p-type devices and n-type devices, it will be appreciated that the polarities of these devices can be switched in other embodiments along with a corresponding change in applied biases. Still further, it will be appreciated that the previously discussed embodiments can be combined in any number of ways. For example, even though FIGS. 6-7 are the only illustrated embodiments that explicitly show a supply voltage being actively driven onto supply node 602, other illustrated embodiments (e.g., FIGS. 3-5) can be modified to actively drive a supply voltage on a supply node. Other combinations are also contemplated as falling within the scope of this disclosure.

Thus, some embodiments disclosed herein relate to an electrostatic discharge (ESD) protection device to protect a circuit that is electrically connected to first and second circuit nodes from an ESD event. The ESD protection device includes a first electrical path extending between the first and second circuit nodes and including first and second ESD detection elements arranged in series thereon. The first and second ESD detection elements are adapted to selectively assert first and second trigger signals, respectively, based on whether the first and second ESD detection elements detect the ESD event. The ESD protection device also includes first and second voltage bias elements electrically connected to the first and second ESD detection elements, respectively. The first and second voltage bias elements are adapted to provide first and second shunt control signals, respectively, based on the first and second trigger signals, respectively. In addition, the ESD protection device includes a voltage controlled shunt network electrically connected to a second electrical path extending between the first and second circuit nodes. The voltage controlled shunt network is electrically connected to the first and second voltage bias elements and is adapted to selectively shunt energy from the ESD event over the second electrical path based on the first and second shunt control signals.

It will be appreciated that identifiers such as "first" and "second" do not imply any type of ordering or placement with respect to other elements; but rather "first" and "second" and other similar identifiers are just generic identifiers. In addition, it will be appreciated that the term "electrically connected" includes direct and indirect connections. For example, if element "a" is electrically connected to element "b", element "a" can be electrically connected directly to element "b" and/or element "a" can be electrically connected to element "b" through element "c", so long as there is an operable electrical connection between elements "a" and "b".

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An integrated circuit comprising:
first and second electrostatic discharge (ESD) protection devices to protect first and second circuits, respectively, from an ESD event, where the first circuit is configured to be biased by a first supply voltage through a first VDD circuit node and a VSS circuit node; and where the second circuit is configured to be biased by a second supply voltage though a second VDD circuit node and the VSS circuit node, where the second supply voltage has a different DC voltage level than the first supply voltage;
wherein the first ESD protection device comprises:
a first electrical path extending between the first VDD circuit node and the VSS circuit node and including first and second ESD detection elements arranged in series thereon; and
a second electrical path extending between the first VDD circuit node and the VSS circuit node and in parallel with the first electrical path, the second electrical path including first and second inverters to pass current between the VDD circuit node and the VSS circuit node, wherein the first and second inverters have first and second inputs, respectively, coupled to respective first and second outputs of the first and second ESD detection elements, respectively; and
a voltage controlled shunt network including a third electrical path in parallel with the first and second electrical paths and also including a fourth electrical path in parallel with the first, second, and third electrical paths, wherein the third electrical path is configured to shunt energy of the ESD event based on an output of the first inverter and independent of an output of the second inverter, and wherein the fourth electrical path is configured to shunt energy of the ESD event based on the output of the second inverter and independent of the output of the first inverter.

2. The integrated circuit of claim 1, wherein the first ESD detection element comprises a first resistive element in series with a first capacitive element, wherein a first ESD detection element output node between the first resistive element and the first capacitive element is operably coupled to a gate terminal of a first shunt transistor on the third electrical path.

3. The integrated circuit of claim 2, wherein the second ESD detection element comprises a second resistive element in series with a second capacitive element, wherein a second ESD detection element output node between the second resistive element and the second capacitive element is operably coupled to a gate terminal of a second shunt transistor on the fourth electrical path.

4. The integrated circuit of claim 3, wherein a supply node, which is coupled to a voltage supply level between the VSS circuit node and the first VDD circuit node, is electrically connected to the first electrical path at a location between the first and second ESD detection elements.

5. The integrated circuit of claim 1, wherein a supply node between the first and second inverters is electrically connected to the first electrical path at a location between the first and second ESD detection elements.

6. The integrated circuit of claim 1:
wherein the first and second ESD detection elements are configured to selectively provide first and second trigger signals, respectively, based on whether a voltage difference between the first and second circuit nodes exceeds a predetermined voltage threshold;
wherein first and second inverters are adapted to provide first and second shunt control signals, respectively, based on the first and second trigger signals; and
wherein the voltage controlled shunt network is configured to selectively shunt energy from the ESD event from the first VDD circuit node over the third and fourth electrical paths to the VSS circuit node, or vice versa, based on the first and second shunt control signals.

7. An integrated circuit, comprising:
first and second electrostatic discharge (ESD) protection devices to protect first and second circuits, respectively, from an ESD event, where the first and second circuits are configured to be biased by first and second supply voltages, respectively, and wherein the first supply voltage has a DC voltage level that is different from that of the second supply voltage;
wherein the first ESD protection device comprises:
a first electrical path extending between a first VDD circuit node and a VSS circuit node and including a first number, N, of ESD detection elements arranged in series thereon, the N ESD detection elements adapted to selectively assert N trigger signals, respectively, based on whether the N ESD detection elements detect the ESD event;
N inverter chains having respective inputs electrically connected to respective outputs of the N ESD detection elements, the N inverter chains adapted to provide N shunt control signals based on the N trigger signals, respectively; where the N inverter chains are made up of a plurality of inverters whose respective inverter outputs are inverted versions of their respective inverter inputs, and where respective inverter inputs of subsequent inverters are tied to inverting outputs of immediately preceding inverters, respectively; and
a voltage controlled shunt network, which includes at least N switching elements electrically connected on N respective electrical paths extending in parallel with the first electrical path between the first VDD and VSS circuit nodes, wherein control gate terminals of the N switching elements, respectively, are directly connected to respective outputs of the N inverter chains; and wherein an electrical path is adapted to selectively shunt energy from the ESD event from the first VDD circuit node to the VSS circuit node, or vice versa, based on a shunt control signal provided to a control gate terminal of a switching element on the electrical path and independent of the other shunt control signals.

8. The integrated circuit of claim 7, wherein the voltage controlled shunt network comprises:
a first shunt transistor arranged on a first of the N electrical paths of the voltage controlled shunt network and having a control terminal tied to an output of a first inverter chain; and
a second shunt transistor arranged on a second of the N electrical paths of the voltage controlled shunt network and having a control terminal tied to an output of a second inverter chain, the second of the N electrical paths extending between the first VDD node and the VSS node and arranged in parallel with the first of the N electrical paths.

9. The integrated circuit of claim 7, wherein a first ESD detection element comprises a first resistive element in series with a first capacitive element, wherein a first ESD detection element output node between the first resistive element and the first capacitive element is electrically connected to an input of a first inverter chain.

10. The integrated circuit of claim 9, wherein a second ESD detection element comprises a second resistive element in series with a second capacitive element, wherein a second ESD detection element output node between the second resistive element and the second capacitive element is electrically connected to an input of a second inverter chain.

11. The integrated circuit of claim 10, wherein the first and second ESD detection elements are configured to selectively provide first and second trigger signals, respectively, based on whether a voltage difference between the first VDD and VSS circuit nodes exceeds a predetermined voltage threshold.

12. The integrated circuit of claim 7, wherein a first inverter chain comprises:
a first inverter element having an input electrically connected to a first ESD detection element and an output electrically connected to the voltage controlled shunt network.

13. The integrated circuit of claim 12, wherein a second inverter chain comprises:
a second inverter element having an input electrically connected to a second ESD detection element and an output electrically connected to the voltage controlled shunt network.

14. The integrated circuit of claim 7, wherein the second ESD protection device comprises:
a third electrical path extending between a second VDD circuit node and the VSS circuit node and including a second number of ESD detection elements arranged in series thereon, the second number of ESD detection elements differing from the first number of ESD detection elements; and
a fourth electrical path extending in parallel with the third electrical path between the second VDD circuit node and the VSS circuit node, the fourth electrical path including the second number of shunt transistors arranged in series thereon and having respective gate terminals coupled to respective outputs of the second number of ESD detection elements to selectively shunt energy from the ESD event from the second VDD circuit node over the fourth electrical path to the VSS circuit node, or vice versa, to protect the second circuit.

15. An ESD protection device, comprising:
a first electrical path extending between a first circuit node and a second circuit node and including first and second ESD detection elements arranged in series thereon; and
a second electrical path extending between the first circuit node and the second circuit node and in parallel with the first electrical path, the second electrical path including first and second voltage bias elements arranged thereon, wherein the first and second voltage bias elements have first and second inputs, respectively, which are coupled to first and second outputs, respectively, of the first and second ESD detection elements, respectively; and
a voltage controlled shunt network including a third electrical path in parallel with each of the first and second electrical paths and further including a fourth electrical path in parallel with each of the first, second, and third electrical paths;
wherein the third electrical path is configured to shunt energy of an ESD event between the first and second circuit nodes based on an output of the first voltage bias element and independent of an output of the second voltage bias element.

16. The ESD protection device of claim 15, wherein the fourth electrical path is configured to shunt energy of the ESD event between the first and second circuit nodes based on the output of the second voltage bias element and independent of the output of the first voltage bias element.

17. The ESD protection device of claim 16, wherein the first circuit node is a VDD circuit node and the second circuit node is a VSS circuit node.

18. An ESD protection device, comprising:
a first electrical path extending between a first circuit node and a second circuit node and including first and second ESD detection elements arranged in series thereon; and
a second electrical path extending between the first circuit node and the second circuit node and in parallel with the first electrical path, the second electrical path including first and second voltage bias elements arranged thereon, wherein the first and second voltage bias elements have first and second inputs, respectively, which are coupled to first and second outputs, respectively, of the first and second ESD detection elements, respectively; and
a voltage controlled shunt network including a third electrical path in parallel with each of the first and second electrical paths and further including a fourth electrical path in parallel with each of the first, second, and third electrical paths;
wherein the third electrical path includes a first shunt transistor having a gate terminal and first and second source/drain terminals, wherein the gate terminal of the first shunt transistor is coupled directly to an output of the first voltage bias element, the first source/drain terminal of the first shunt transistor is coupled directly to the first circuit node, and the second source/drain terminal of the first shunt transistor is coupled directly to the second circuit; and
wherein the fourth electrical path includes a second shunt transistor having a gate terminal and first and second source/drain terminals, wherein the gate terminal of the second shunt transistor is coupled directly to an output of the second voltage bias element, the first source/drain terminal of the second shunt transistor is coupled directly to the first circuit node, and the second source/drain terminal of the second shunt transistor is coupled directly to the second circuit.

19. The ESD protection device of claim 18, wherein the first circuit node is a VDD circuit node and the second circuit node is a VSS circuit node.

* * * * *